United States Patent [19]

Carpenter, II et al.

[11] Patent Number: 5,741,876

[45] Date of Patent: Apr. 21, 1998

[54] METHOD OF PREPARING POWDERED SILICONE RESINS

[75] Inventors: Leslie Earl Carpenter, II, Tokyo, Japan; Jason Richard Cassiday, Midland, Mich.; Leon Neal Cook, Midland, Mich.; Linda Moy Madore, Midland, Mich.; Theodore Arnold Oberhellman, III, Midland, Mich.; Randall Gene Schmidt, Midland, Mich.; Hongxi Zhang, Midland, Mich.

[73] Assignee: Dow Corning Corporation, Midland, Mich.

[21] Appl. No.: 774,864

[22] Filed: Dec. 23, 1996

Related U.S. Application Data

[63] Continuation-in-part of Ser. No. 497,736, Jul. 3, 1995.

[51] Int. Cl.$^6$ .................................................. C08G 77/00
[52] U.S. Cl. ............................................ 528/10; 524/588
[58] Field of Search ................................ 528/10; 524/588

[56] References Cited

U.S. PATENT DOCUMENTS

| | | | |
|---|---|---|---|
| 2,676,182 | 4/1954 | Daudt et al. | 260/448.2 |
| 4,256,870 | 3/1981 | Eckberg | 528/15 |
| 4,309,520 | 1/1982 | Blizzard | 525/477 |
| 4,935,484 | 6/1990 | Wolfgruber et al. | 528/34 |
| 5,319,040 | 6/1994 | Wengrovius et al. | 525/478 |
| 5,324,806 | 6/1994 | Wengrovius et al. | 528/10 |
| 5,346,941 | 9/1994 | Furukawa et al. | 524/268 |
| 5,357,007 | 10/1994 | Wengrovius et al. | 525/478 |

*Primary Examiner*—Melvyn I. Marquis
*Attorney, Agent, or Firm*—Arne R. Jarnholm

[57] ABSTRACT

A method of obtaining fine-grained, free-flowing powdered silicone resins is disclosed. The powdered silicone resins contain very low or no residual aromatic solvents or other volatile organic compounds. The method includes the steps of (1) preparing a solution of an MQ silicone resin dissolved in a volatile liquid organosilicon solvent, such as hexamethyldisiloxane, and (2) spray-drying the solution obtained in step (1) to produce the silicone resin powder.

13 Claims, No Drawings

METHOD OF PREPARING POWDERED SILICONE RESINS

CROSS-REFERENCE TO RELATED APPLICATION

This application is a continuation-in-part of copending application application Ser. No. 08/497,736, filed on Jul. 3, 1995.

The present application for patent is a continuation-in-part of U.S. patent application Ser. No. 08/497,736, filed Jul. 3, 1995, both of which applications disclose inventions that were, at the time the inventions were made, subject to an obligation of assignment in a common assignee.

BACKGROUND OF THE INVENTION

1. Field of the Invention

The present invention relates generally to silicone resins and more particularly to a novel method of making solventless silicone resins in the form of powder.

2. Description of the Prior Art

Description of the prior art and the present invention requires that the definition of certain terms be understood.

As used herein, the term "resin" describes a silicone composition wherein the molecular structure is arranged in a predominantly three dimensional network. Thus, the term silicone "resin" is used to distinguish the composition from silicone fluids and silanes. The type of silicone resins utilized in the present invention are macromolecular polymers comprised primarily of $R_3SiO_{1/2}$ and $SiO_{4/2}$ units wherein R is a functional or nonfunctional, substituted or unsubstituted monovalent organic radical. The aforementioned units are sometimes referred to as M and Q units, respectively. Hence, the resins derived therefrom are referred to as "MQ" resins. Those skilled in the art will understand that MQ resins may also include a limited number of $RSiO_{3/2}$ and $R_2SiO_{2/2}$ units, frequently referred to as T and D units, respectively.

As used herein in connection with the description of MQ silicone resins which include M units of the aforesaid general formula $R_3SiO_{1/2}$, the terms "functional or nonfunctional, substituted or unsubstituted monovalent organic radical" as used to describe the R groups, means that each monovalent R group may be independently selected from the group consisting of: hydrogen, alkyl, aryl, alkylaryl, alkenyl, alkynyl, hydroxyl, alkoxy, acetoxy, oximo; and C1–C12 aryl- or alkyl- epoxy, amino, mercapto, acrylol, ether, polyether, fluorocarbon, carboxyl and amide groups, wherein the aryl- or alky- linkages may optionally include oxygen, nitrogen or sulfer substitutions.

Silicone resins are generally produced in such a manner that the resin macromolecules are dissolved in a liquid solvent, which liquid solvent is most typically but not always an organic solvent. Thus, as used herein, the term "solventless" means that substantially all the liquid solvent has been removed from the "solid" resin phase, regardless whether the liquid solvent is an organic solvent or some other type of solvent.

The production of MQ resins is well-known. Several such methods are disclosed in U.S. Pat. No. 2,676,182, Daudt et al., which is incorporated herein by reference for those teachings. For instance, at Example 3, Daudt et al. teach the preparation of a resin starting with a sol formed from an aqueous sodium silicate solution which was diluted with water and HCl. Hexamethyldisiloxane and ethanol were added to the sol. The mixture was agitated and after ten minutes an emulsion formed. The emulsion separated into an aqueous phase and an "organic" phase. The "organic" phase included the MQ resin which was recovered upon removal of the ethanol and excess hexamethyldisiloxane. The material recovered was described as a "white, friable, powdery" resin which was completely soluble in toluene and xylene.

Also described by Daudt et al. (in Example 1) is the use of a triorganohalosilane (trimethylchlorosilane) to "neutralize" the sodium of the sodium silicate sol. In such a reaction, the trimethylchlorosilane acts as an end-blocking agent, thus substantially terminating the acid hydrolysis of the sodium silicate.

It is, however, known in the art that end-blocking carried out with only a triorganohalosilane may leave a fairly high concentration of residual silanol sites in the resin. A very good method of producing an MQ resin having reduced residual silanol (which is consistent with the teachings of Daudt et al.) involves mixing an acid-hydrolyzed sodium silicate sol with an alcohol diluent and a combination of end-blockers, including triorganohalosilanes and hexamethyldisiloxane, before any additions of an organic solvent are made. The reaction mixture is heated to reflux temperatures for a time sufficient to allow for substantial completion of the end-tapping reaction. The mixture is then permitted to separate into an "organic" phase, which includes MQ resin dissolved in hexamethyldisiloxane, and an aqueous phase, which includes the excess water of hydrolysis, alcohol, HCl and NaCl.

The teachings of Daudt et al. do not, however, set forth a method of obtaining solventless MQ resins in powder form in commercial quantities. Neither do Daudt et al. disclose a method for obtaining solventless MQ resins in the form of a fine-grained, free-flowing powder, wherein the solventless resins have extremely low quantities of residual volatile organic compounds.

Another method of producing MQ resins having low residual silanol content is disclosed in U.S. Pat. No. 5,319,040, Wengrovius etal. ("Wengrovius et al. '040") Example 1 describes the preparation of an MQ resin starting with the acid hydrolysis of a sodium silicate solution. Isopropanol, trimethylchlorosilane and a small amount of toluene were then added to the hydrolyzed solution. The reaction mixture was heated to reflux for one and one-half hours and then diluted with a substantial quantity of toluene. Upon standing, the reaction mixture separated yielding an "organic" layer which was water washed. Upon distillation, a water/isopropanol/toluene azeotrope was removed from the mixture. This left a methylsiloxane hydrolyzate resin having a ratio of M:Q units of about 0.65, dissolved in toluene. The solution had about 60 wt. % solids, was again heated to reflux and, in the presence of the toluene solvent, reacted with hexamethyldisilazane to end-block residual silanol groups.

The toluene-dissolved MQ resin was then spray-dried at a temperature of 250° C. to a powder reportedly having 1.2 wt. % residual volatiles.

In U.S. Pat. No. 4,935,484, Wolfgruber et al., there is disclosed a method for obtaining silicone resin powders by spray-drying aqueous colloidal suspensions of organopolysiloxanes. The process utilizes resins prepared from alkoxysilanes, or the partial hydrolyzate thereof, and an emulsifier. The hydrolyrically-formed alkanol is distilled off and the resultant suspension spray-dried. Organopolysiloxanes, which are free of alkoxy groups and which have a maximum of eight siloxane units per molecule, may also be employed, provided that they are mixed with at least one alkoxy silane or a partial hydrolyzate thereof.

According to the teachings of U.S. Pat. No. 5,324,806 Wengrovius et al. ("Wengrovius et al. '806") the method of Wolfgruber et al. suffers from the drawback that the powdered resins produced thereby are incompatible with silicone fluids. Further according to Wengrovius et al. '806, the powder resins of Wolfgruber et al. are contaminated with an emulsifying agent.

Wengrovius et al. '806 also disclose a method of making a free-flowing silicone resin powder in which an organosiloxane hydrolyzate is dissolved into an organic solvent and thereafter spray-dried. However, the powder resins produced by either Wengrovius et al. '040 or '806 suffer from the drawback that they contain high concentrations of residual organic solvent.

Thus, it would be highly desirable to provide a method of preparing solventless silicone resin powders, wherein the resins have a very low or no volatile organic compound residue. Such method should also be capable of producing such solventless silicone resins in commercial quantities.

BRIEF SUMMARY OF THE INVENTION

In accordance with the present invention, there is provided a method of preparing silicone resin powder, comprising the steps of:

(1) preparing a solution of an MQ silicone resin in a volatile liquid organosilicon solvent;

said MQ silicone resin including M units of the general formula $R_3SiO_{1/2}$ and Q units of the general formula $SiO_{4/2}$ wherein R is a functional or nonfunctional, substituted or unsubstituted monovalent organic radical;

said silicone resin having a ratio of M groups to Q groups between about 0.4 and about 1.1;

said silicone resin having a number average molecular weight between about 2,000 and 15,000 and a polydispersity ranging from 1.0 to about 6.0;

said solution having a resin solids content between about 5% and about 70% by weight; and (2) spray-drying the solution obtained in step (1) to remove the volatile liquid organosilicon solvent therefrom to produce a silicone resin powder;

said spray-drying step (2) being carried out at a temperature between about 80° C. and about 350° C.

In the preferred embodiment of the invention, the volatile liquid organosilicon solvent is an end-blocking agent used in the synthesis of the MQ resin. In this embodiment of the invention, the volatile endblocker can be recovered during the spray-drying step (2) and recycled for use in the preparing step (1).

Also in the preferred embodiment of the invention, each R group is a monovalent organic radical independently selected from the group consisting of: hydrogen, alkyl, aryl, alkylaryl, alkenyl, alkynyl, hydroxyl, alkoxy, acetoxy, oximo; and C1–C12 aryl- or alkyl- epoxy, amino, mercapto, acrylol, ether, polyether, fluorocarbon, carboxyl and amide groups, wherein the aryl- or alky- linkages may optionally include oxygen, nitrogen or sulfer substitutions, with the proviso that at least sixty mole percent of said R radicals are methyl.

In accordance with the invention, the volatile liquid organosilicon solvent may be contaminated with up to 5 weight percent of an aromatic solvent.

The method of the invention can be used to produce solventless powdered resins which have either low or no residual organic solvent.

In one embodiment of the invention, the volatile liquid organosilicon solvent may be contaminated with small quantities organic solvents, including aromatics. Contamination levels may be as high as about 5 weight percent for aromatics and about 20 weight percent for total organics. Most preferred however, is a maximum of about 2.5 to 3.0 weight percent aromatics and about 10 weight percent or less for total organics. When a contaminated volatile liquid organosilicon solvent is used in conjunction with the method of the present invention, the residual volatile organic compound residue, and in particular the amount of residual aromatics of the powdered solventless MQ resins is still substantially below that produced by prior art methods.

In another embodiment of the invention, the volatile liquid organosilicon solvent is in pristine condition. In this embodiment of the invention, the powdered solventless MQ resin produced therefrom has no residual volatile aromatic compounds, although trace amounts of other organic volatiles, such as alcohols, may be present.

Regardless whether the volatile organosilicon solvent used in conjunction with the method of the invention is a distilled or pristine product, the powdered, solventless MQ resins obtained thereby are readily dispersed and incorporated into the formulation of other products, such as organic plastics, silicone rubbers and paint formulations.

It is therefore an object of the present invention to provide a method of obtaining an MQ resin in powdered form.

It is a feature of the method of the present invention that the MQ resins produced thereby have very low or no residual volatile organic compounds.

The aforementioned objects and features of the present invention will become clear to those skilled in the art from the following Detailed Description of the Invention.

DETAILED DESCRIPTION OF THE INVENTION

In accordance with the present invention, an MQ resin is first prepared in such a manner that the resin is dissolved in a volatile organosilicon solvent. The MQ resin can be prepared using the teachings of previously-mentioned U.S. Pat. No. 2,676,182, Daudt et al., and segregated in a volatile liquid organosilicon solvent. The solventless MQ silicone resin, in powder form, is then recovered by spray-drying the solution.

It is important to note that what is described by Daudt et al. as an "organic" layer, for instance in Example 3, is the MQ resin dissolved in hexamethyldisiloxane. It is believed that the term "organic" is used to describe this separated phase to distinguish it from the aqueous phase which arises from the acid hydrolysis of sodium silicate. The organic phase will generally include small quantities of alcohol that failed to segregate into the aqueous phase.

As used herein, the term "volatile liquid organosilicon solvent" is meant to encompass many relatively low molecular weight organosilicon compounds including cyclosiloxanes, disilazanes, linear siloxanes and disiloxanes. The volatile liquid organosilicon solvent should be relatively insoluble in water and the MQ resin should be relatively soluble therein to permit the separation of the MQ resin from the aqueous phase which is formed during acid hydrolysis of the starting silicate.

In the preferred embodiment of the invention, the volatile organosilicon solvents also function as end-blocking agents. While volatile liquid organosilicon solvents that do not function as end-blockers can be used in conjunction with practice of the present invention, it will be apparent that such use is often uneconomical.

Some of the preferred volatile liquid organosilicon solvent end-blocking agents impart no reactive functionality to the final resin product (referred to herein as "nonfunctional end-blockers") and include compounds such as hexamethyldisiloxane, hexamethyldisilazane, trimethylchlorosilane and mixtures thereof, with hexamethyldisiloxane being the most preferred. As used herein, the term "non-functional" means that the endblocker does not add radical species to the MQ resin that are generally considered as rendering the resin capable of further polymerization. Others that do impart the final resin product with reactive functional groups (referred to herein as "functional end-blockers") include divinyltetramethyldisiloxane, divinyltetramethyldisilazane, dimethyldichlorosilane, tetramethyldihydrogendisiloxane and other Si—H functional short-chained siloxanes.

Generally speaking, a small amount of functional end-blocker may be combined with a nonfunctional endblocker during processing to yield a final spray-dried resin product having a predetermined number average of functional groups per molecule. Functional end-blockers can also be used for subsequent treatment of resins having residual silanol functionality.

It will be understood by those skilled in the art that the term "volatile," as used to describe the liquid organosilicon solvent, is meant to be relative to the conditions of spray-drying. The spray-drying step is carried out at temperatures between about 80° C. and about 350° C., and more preferably between about 150° C. and 250° C. The vapor pressure of the volatile liquid organosilicon solvent at the spray-drying temperature should be sufficiently high to ensure that substantially all is removed from the solution, leaving the solventless silicone resin. It will also be understood by those skilled in the art that spray-drying may be carried out under reduced pressures to aid in removal of the solvent.

Many of the volatile organosilicon liquid solvents suggested herein or usable in connection with the present invention are readily combustible. Accordingly, spray-drying therewith may require precautionary measures such as the use of a nitrogen or argon blanket.

The process of spray-drying is well-known in the art and it is recognized that the success thereof depends on many related parameters, including the feed rate of solution, the caloric input to the spray-drying apparatus and the inlet temperature and length of the hot zone. These parameters can also be used to control the particle size of the powders obtained therefrom. Surprisingly, the present inventors have found that powdered resins produced in accordance with the present invention, i.e. spray-dried from a volatile liquid organosilicon solvent, consistently have a finer grain size and are more free-flowing than powders spray-dried from organic solvents, as is taught by the prior art, even though all spray-drying parameters are held constant. For example, when spray-drying from a volatile organic solvent (i.e. in accordance with the prior art,) the present inventors noted that the spray-dried resin produced therefrom tended to stick to the walls of the drying chamber of the spray-drying unit. No such sticking was noted when spray-drying was carried out in accordance with the present invention.

In connection with the present invention it has been discovered that spray-drying with an inlet temperature much less than about 80° C. is impractical. Even though a solventless powdered resin can be obtained from a resin dissolved in hexamethyldisiloxane, the processing rate is too slow to be considered commercially viable. When spray-dryer temperatures in excess of about 350° C. are employed, the MQ resin is susceptible to physical degradation from softening and to chemical degradation, especially if it includes functional groups.

The molecular weight and the ratio of M groups to Q groups in the resin product are important to obtaining a good spray-dried resin powder.

It has been found that if the ratio of M:Q is less than about 0.4, or if the number average molecular weight (Mn) of the resin exceeds about 15,000, the resin begins to lose its solubility in hexamethyldisiloxane, the most preferred volatile liquid organosilicon solvent. It is expected that the solubility of the resin product in other types of liquid organosilicon solvents would be likewise affected by the same parameters, however the limits of those parameters for such other solvents is presently unknown.

Conversely, if the Mn of the resin is less than about 2,000, or if the M:Q ratio thereof exceeds about 1.1, the spray-dried resin product obtained therefrom is more mud-like, forming a cake rather than a free-flowing powder.

Finally, if the polydispersity of the MQ resin is much greater than about 6.0, the proportion of insoluble, high molecular weight resin molecules becomes too large for effective spray-drying.

Further in accordance with the invention, the MQ resin solution is prepared such that the general formula of the M groups is $R_3SiO_{1/2}$ wherein each R is a monovalent radical independently selected from the group consisting of hydrogen, hydroxyl, alkyl, alkenyl, alkoxy, oximo, aryl, epoxide, carboxyl, ether, amide and alkyl amino radicals. In the preferred embodiment of the invention with the proviso that at least 60 mole percent of the R radicals are methyl.

EXAMPLES

Examples 1–3

An MQ resin was first prepared in accordance with the teachings of Daudt et al., by the acid hydrolysis of an aqueous sodium silicate solution. Thereafter, isopropanol, hexamethyldisiloxane (recycled and containing a 2.5 weight percent xylene) and trimethylchlorosilane were added and the reaction mixture heated to about 70° C. The reaction mixture was then permitted to separate into an aqueous phase and an "organic" phase. The aqueous phase included most of the isopropanol, excess water and NaCl and HCl. The "organic" phase included an MQ resin dissolved in hexamethyldisiloxane, substantially all excess trimethylchlorosilane being hydrolyzed and condensed to hexamethyldisiloxane.

The organic phase was recovered and found to have a resin content of 36 weight percent and was designated as Resin Solution 1 and a xylene content of about 2.5 weight percent.

The MQ resin produced by the above process had a number average molecular weight of about 4,500 and an empirical formula of about 43 mole % M units of $(CH_3)SiO_{1/2}$, about 12 mole % T units of $(OH)SiO_{3/2}$, and about 45 mole % Q units of $SiO_{4/2}$.

Resin Solution 2 was prepared by adding xylene to Resin Solution 1 and distilling off the bulk of the hexamethyldisiloxane. Resin Solution 2 had a resin content of 35 weight percent and a residual hexamethyldisiloxane content of about 1 weight percent.

Resin Solution 3 was prepared by dissolving powdered resin (obtained by spray-drying Resin Solution 2 in accordance with the procedure set forth below) in a toluene solvent. Resin Solution 3 had a resin content of about 35 weight percent.

Resin Solutions 1, 2 and 3 were spray-dried using a Type HT, Niro Mobile Minor Spray-Dryer available from Niro Atomizer, Inc. of Columbia, Md. Spray-drying was carried out under inert conditions, using nitrogen gas for atomization as well as blanketing the drying chamber. Resin Solutions were fed into the spray-dryer at the rate of 50 lb./h (22.7 kg/h). The nitrogen flow rate at the atomizer nozzle was 0.49 ft$^3$/minute (0.0139 m$^3$/minute) at a pressure of 6–7 psi (41–48 kPa). The nitrogen flow rate into the drying chamber was about 70 ft$^3$/minute (1.98 m$^3$/minute) at a temperature of 220° C. The exit temperature of nitrogen from the drying chamber was about 105° C.–112 ° C.

The powders so-produced were then observed and tested for non-volatile content, density, both before and after packing (250 ml graduated cylinder subjected to 500 machine-controlled taps) particle size (Coulter LS-130 (air medium) from Coulter Corp., Miami, Fla.) and aromatic content (UV absorbance). The results are set forth in Table 1, below.

TABLE 1

| Analysis | Powder Source | | |
|---|---|---|---|
| | Solution 1 | Solution 2 | Solution 3 |
| appearance | white powder | white powder | white powder |
| Non-volatile content (%) | 97.8 | 97.6 | 97.4 |
| Density (g/cm$^3$) | | | |
| Before Packing | 0.18 | 0.48 | 0.47 |
| After Packing | 0.24 | 0.59 | 0.56 |
| Mean Particle Size (μm) | 19.9 | 67.6 | 75.8 |
| Aromatic Content (ppm) | 690 | 16,500 | 13,900 |

The above data clearly show that spray-drying silicone resins from a volatile liquid organosilicon solvent leads to a resin powder having a very low aromatic content, even though the solvent was contaminated with 2.5 weight percent xylene. Furthermore, spray-drying from the volatile liquid organosilicon solvent produced a resin powder having an unexpectedly fine particle size and low density, even after packing, as compared to the powders obtained from spray-drying from xylene and toluene solutions. Finally, during the spay drying process it was noted that the powders obtained from the aromatic solutions had a tendency to stick to the wall of the drying chamber. No such sticking was noted with the resin powders obtained from Resin Solution 1. Thus, spray-drying resins from a solution in a volatile liquid organosilicon solvent yields a free-flowing, non-agglomerating powder.

Each of the resins powders obtained above was placed in a sealed container and heated to a temperature of 200° C. for 15 hours. The headspace in the containers was then analyzed by gas chromatography (utilizing a flame ionization detector) and mass spectrometry to determine the major volatile components in the resin powders and the relative proportions thereof. The relative proportions were obtained from the area percents present in the chromatograms. The results are set forth in Table 2, below.

TABLE 2

| Powder Source | Volatile Component (%) | | | |
|---|---|---|---|---|
| | hexamethyl-disiloxane | xylene | toluene | alcohol |
| Solution 1 | 81.2 | 14.8 | 1.1 | 2.9 |
| Solution 2 | 2.4 | 97.2 | 0.0 | 0.4 |
| Solution 3 | 9.3 | 7.7 | 82.5 | 0.5 |

Thus, it can be seen that the level of residual VOC (volatile organic compounds) in the resin powders spray-dried in accordance with the present invention is quite low.

On Oct. 5, 1994, the United States Environmental Protection Agency published a Final Rule, *Air Quality: Revision to Definition of Volatile Organic Compounds—Exclusion of Volatile Methyl Siloxanes and Parachlorobenzotrifluoride* at 59 FR 50693. The Final Rule exempted a number of volatile methylated siloxane compounds from the EPA's definition of volatile organic compounds for purposes of preparing State implimentation plans to obtain national ambient air quality standards for ozone under Title I of the Clean Air Act. Included among those exempted siloxane compounds are a number of volatile liquid organosilicon solvents that are ideal for practicing the method of the present invention. Hence, liquid organosilicon solvents that fall within the above exemptions, and which are residual volatiles in the silicone resin powders produced in accordance with the invention, are of no environmental significance.

It should be noted that hexamethyldisiloxane, the most preferred volatile liquid organosilicon solvent of the present invention, is so-exempted.

Accordingly, of the above Examples, only the resin powder produced in accordance with the present invention, that derived from Resin Solution 1, had the desirable attributes of extremely low residual volatile organic compounds, a fine particle size and free-flowing characteristics.

Examples 4–7

A new resin solution, Resin Solution 4 was prepared in a manner identical to that described in connection with Resin Solution 1, above, except that pristine, and not contaminated, hexamthyldisiloxane was used. Thereafter, Resin Solutions 5–7 were prepared by doping Resin Solution 4 with increasing amounts of xylene. Thus, Resin Solutions 5–7 had residual xylene contents of 0.1 weight percent, 0.5 weight percent and 1.0 weight percent, respectively. Thereafter, Resin Solutions 4–7 were spray-dried in the manner previously described. None of the powdered resins had any tendency to stick to the wall of the drying chamber during spray-drying. The powdered resins so-produced were observed and tested for particle size (Coulter LS-130 (air medium) from Coulter Corp., Miami, Fla.) and aromatic content (UV absorbance).

A free-flowing white powder was produced from each of Resin Solutions 4–7. The mean particle size of the powders, in μm, was 17.9, 18.2, 18.2 and 17.7, respectively. The aromatic content of the powders produced from Resin Solutions 4 and 5 was below the detectable limit of 5 ppm. The aromatic content of the powders produced from Resin Solutions 6 and 7 was 110 and 185 ppm, respectively.

The above data illustrate that free-flowing, fine-grained, spray-dried resins powders having extremely low levels of volatile organic compounds may be produced in accordance with the present invention.

Although various embodiments of the present invention have been illustrated byway of example so as to show the features and advantages of the invention, the scope thereof is not so-limited and should be defined only in accordance only with the following claims and equivalents thereof.

What is claimed is:

1. A method of preparing silicone resin powder, comprising the steps of:

(1) preparing a solution of an MQ silicone resin in a volatile liquid organosilicon solvent;

said solution including no more than 5 weight percent of an aromatic organic solvent, based on the weight of said volatile liquid organosilicon solvent;

said MQ silicone resin including M units of the general formula $R_3SiO_{1/2}$ and Q units of the general formula $SiO_{4/2}$ wherein R is a functional or nonfunctional, substituted or unsubstituted monovalent organic radical;

said silicone resin having a ratio of M groups to Q groups between about 0.4 and about 1.1;

said silicone resin having a number average molecular weight between about 2,000 and 15,000 and a polydispersity ranging from 1.0 to about 6.0;

said solution having a resin solids content between about 5% and about 70% by weight; and (2) spray-drying the solution obtained in step (1) to remove the volatile liquid organosilicon solvent therefrom to produce a silicone resin powder;

said spray-drying step (2) being carried out at a temperature between about 80° C. and about 350° C.

2. A method in accordance with claim 1 wherein said volatile liquid organosilicon solvent is an endblocker.

3. A method in accordance with claim 2 wherein said endblocker is functional.

4. A method in accordance with claim 2 wherein said endblocker is non-functional.

5. A method in accordance with claim 1 wherein said liquid organosilicon solvent is selected from the group consisting of cyclosiloxanes, disilazanes, linear siloxanes, alkoxysilanes, alkylhalosilanes and combinations thereof.

6. A method in accordance with claim 1 wherein said liquid organosilicon solvent is selected from the group consisting of hexamethyldisiloxane, hexamethyldisilazane, trimethylchlorosilane, divinyltetramethyldisiloxane, divinyltetramethyldisilazane, dimethyldichlorosilane, tetramethyldihydrogendisiloxane and mixtures thereof.

7. A method in accordance with claim 1 wherein said spray-drying step (2) is carried out at a temperature between about 150° C. and 250° C.

8. A spray-dried silicone resin powder made in accordance with the method of claim 1.

9. A spray-dried silicone resin powder in accordance with claim 8 having a residual aromatic content less than about 200 ppm.

10. A spray-dried silicone resin powder in accordance with claim 9 having a residual aromatic content less than about 5 ppm.

11. A spray-dried silicone resin powder in accordance with claim 8 having a residual volatiles content less than about 3 percent.

12. A spray-dried silicone resin powder in accordance with claim 8 having a mean particle size less than about 20 µm.

13. A spray-dried silicone resin powder in accordance with claim 8 having residual volatile organic content of less than about 0.5 weight percent.

* * * * *